June 13, 1967 J. L. BONANNO 3,324,997
DISPLAY BOX FOR DOLLS AND THE LIKE
Filed April 9, 1964 4 Sheets-Sheet 1
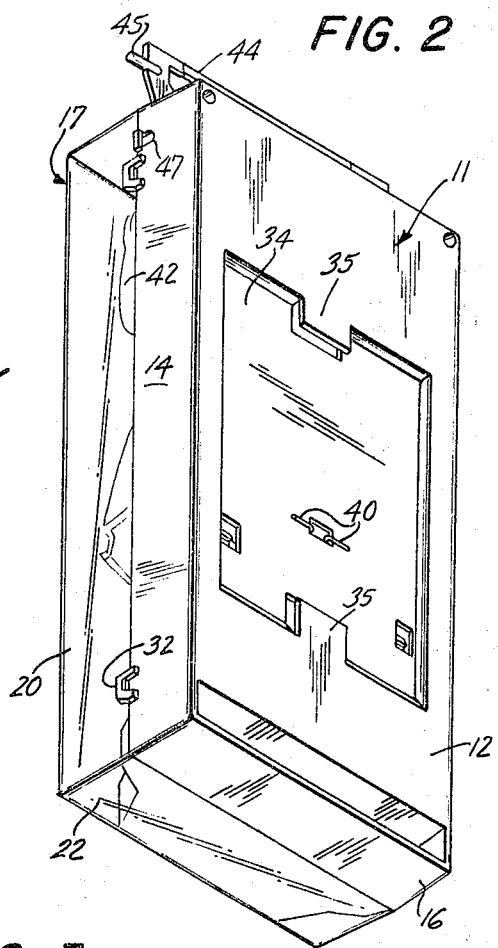
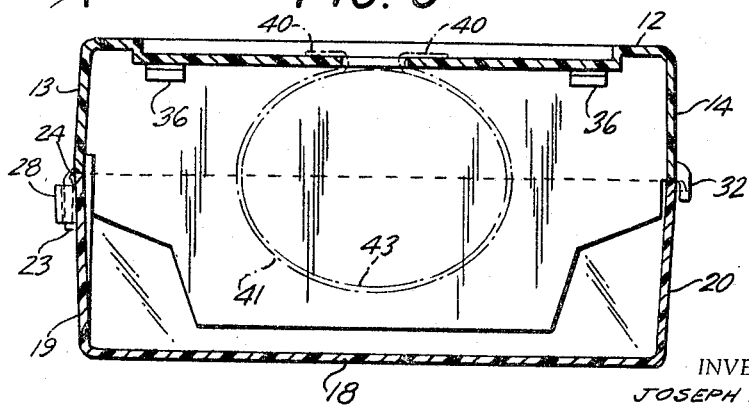
INVENTOR:
JOSEPH L. BONANNO
BY Frederick Breitenfeld
ATTORNEY June 13, 1967  J. L. BONANNO  3,324,997

DISPLAY BOX FOR DOLLS AND THE LIKE

Filed April 9, 1964  4 Sheets-Sheet 2

INVENTOR:
JOSEPH L. BONANNO

BY *Frederick Breitenfeld*
ATTORNEY

June 13, 1967  J. L. BONANNO  3,324,997
DISPLAY BOX FOR DOLLS AND THE LIKE
Filed April 9, 1964 4 Sheets-Sheet 3

INVENTOR:
JOSEPH L. BONANNO
BY Frederick Breitenfeld
ATTORNEY

June 13, 1967  J. L. BONANNO  3,324,997
DISPLAY BOX FOR DOLLS AND THE LIKE
Filed April 9, 1964  4 Sheets-Sheet 4
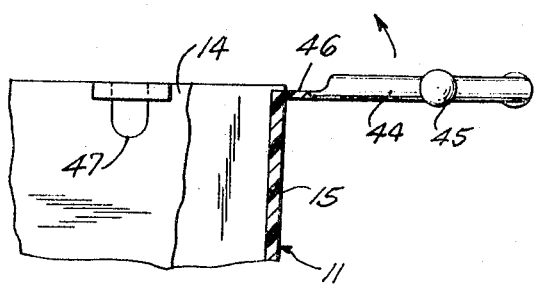
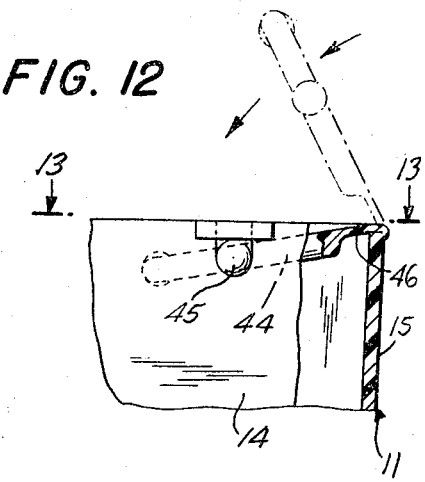
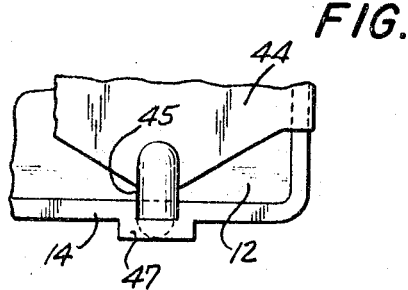
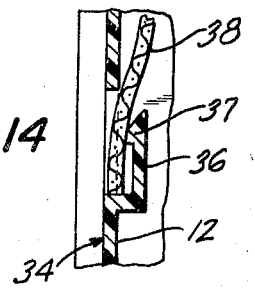
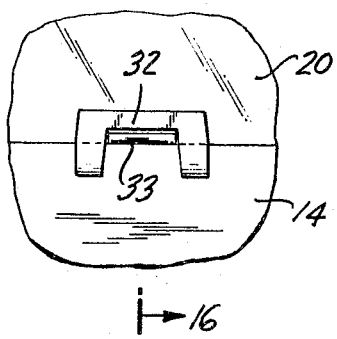
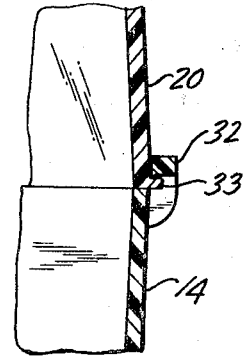
INVENTOR:
JOSEPH L. BONANNO
BY Frederick Breitenfeld
ATTORNEY

United States Patent Office 3,324,997
Patented June 13, 1967

3,324,997
DISPLAY BOX FOR DOLLS AND THE LIKE
Joseph L. Bonanno, South Orange, N.J., assignor to De Luxe Topper Corporation, Elizabeth, N.J., a corporation of New Jersey
Filed Apr. 9, 1964, Ser. No. 358,543
16 Claims. (Cl. 206—45.34)

This invention relates generally to boxes, and has particular reference to a display box for an article of merchandise such as a doll.

Certain features of the invention make it particularly suitable for the accommodation of dolls, and for this reason the invention will be described and illustrated in an embodiment serving this specific purpose. However, the invention is in a number of respects of wider applicability.

A general object of the invention is to provide a box of inexpensive but attractive appearance, composed at least in part, and preferably in its entirety, of molded plastic, with body and cover elements hingedly connected in an unusually staunch manner without rivets, separate hinge elements, or other extraneous parts.

A more particular object is to provide a box of the character described in which the cover is of rigid clear transparent material.

Another objective is to provide a box provided in an unusually effective way with an integral carrying handle that can also serve, when adjusted in a special way, as a hanger for dolls' clothes or for any analogous purpose.

Among the novel features of the invention are special integrally formed means for hingedly supporting the cover and the carrying handle, for accommodating a descriptive booklet or the like in close but inconspicuous association with the box, and for supporting a dressed doll within the box in a secure fashion which holds the doll against displacement but which nevertheless allows the doll to maintain an attractive display disposition at all times.

A particular feature of the invention resides in the manner in which the hinging of the cover to the body has been achieved. Flexible hinges can be formed as integral parts of certain elastomers, notably polypropylene, but such moldable plastics are not transparent. Those which are available in clear transparent form, such as the acrylics, do not lend themselves to the formation of integral hinges. The present invention resolves this problem in a thoroughly practicable way.

A basic general object of the invention is to provide a box structure having the special features referred to, which can be manufactured economically on a commercial scale, and used for long periods of time without breakage or impairment of its appearance or play value.

The preferred way of achieving these objects and advantages, and such other benefits as may be pointed out hereinafter, is illustrated in the accompanying drawings, in which—

FIG. 1 is a perspective view, from the front, of a box embodying the features of this invention, with an illustrative doll accommodated therein;

FIG. 2 is a similar view, from the rear and from beneath;

FIG. 3 is a cross-sectional view substantially along the line 3—3 of FIG. 1;

FIG. 11 is a fragmentary view, partly in cross-section, of the upper end of the body section of the box, to illustrate a feature of the carrying handle;

FIG. 12 is a view similar to FIG. 11, showing the handle adjusted into the body section of the box;

FIG. 13 is a fragmentary detail view substantially in the direction 13—13 of FIG. 12;

FIG. 14 is an enlarged cross-sectional detail along the line 14—14 of FIG. 4;

FIG. 15 is a fragmentary enlarged detail of one of the clasps between the box sections; and FIG. 16 is a cross-sectional view along the line 16—16 of FIG. 15.

Figure 4:
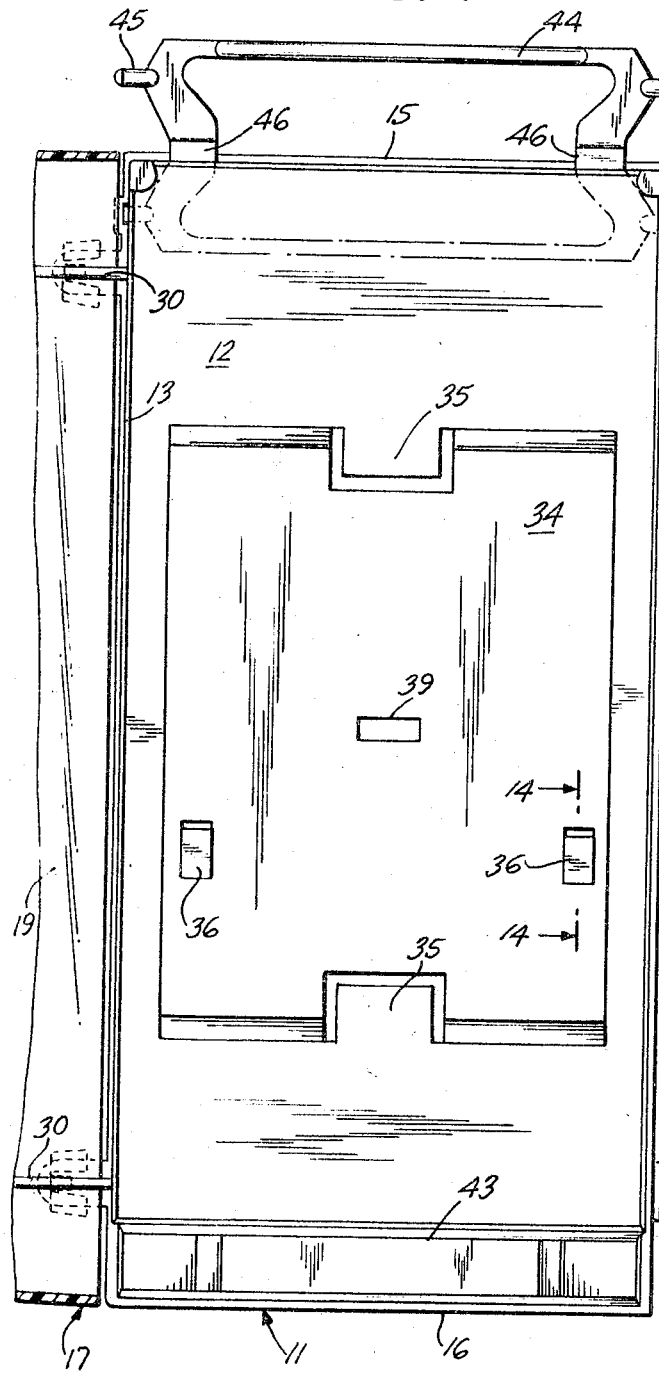
FIG. 4 is a front elevational view of the box with the cover element completely opened toward the left, the box being empty.

The box consists of two opposed substantially rectangular sections, each of which has a main rectangular wall and upstanding peripheral walls. The body section 11 is composed of an elastomer of the type exemplified by polypropylene, this being a moldable plastic which is substantially rigid except in thinned web-like regions in which it is not only flexible but has great flexure strength and high fatigue resistance. The box section 11 has a central wall 12, relatively long peripheral side walls 13 and 14, and relatively short end walls 15 and 16. Since the box is intended to function mainly in the disposition shown in FIG. 1, the end wall 15 will, for the sake of convenience, be designated a top wall, while the wall 16 will be considered the bottom wall.

The other box section 17 may be considered a cover. It is composed of a rigid clear transparent material, preferably a moldable transparent plastic of the class which includes the acrylics, the butyrates, the propionates, the acetates, polystyrene, and the like. The cover section 17 has a main central wall 18, a pair of opposed relatively long side walls 19 and 20, and relatively short top and bottom walls 21 and 22.

One of the features of the invention relates to the manner in which these two box sections are assembled in a permanently hinged relationship, without recourse to extraneous hinge elements, rivets, or other expedients. A special problem is presented by virtue of the fact that materials which are clear and transparent are not sufficiently bendable to permit the formation of integral hinges. It is for this reason that the invention forms the body section 11 of the box of a material, such as polypropylene, adapted to be molded with flexible hinge regions. The problem has been worked out as indicated in FIGS. 6–10 to which reference is now directed.

On the edge of the side wall 13 of the body section a projecting tongue 23 is formed as an integral molded part of the section, being joined thereto by a thinned region 24. This tongue is provided in a location where a hinge connection is desired, and in the illustrated embodiment of the invention there are two such tongues, one near the bottom of the box, the other near the top, but since they are identical the construction illustrated in FIGS. 6–10 will suffice to explain them both.

Figure 9:
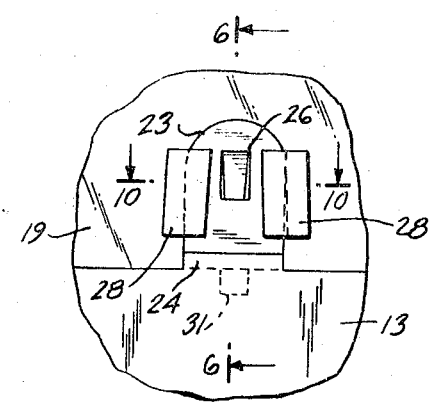
FIG. 9 is a face view of one of the hinges.
Figure 6:
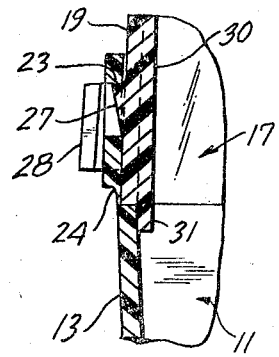
FIG. 6 is an enlarged fragmentary cross-sectional view along the line 6—6 of FIG. 1 and along the line 6—6 of FIG. 9.
Figure 10:
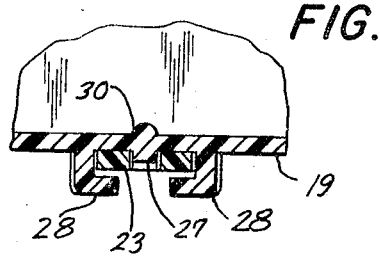
FIG. 10 is a fragmentary cross-sectional view along the line 10—10 of FIG. 9.
Figure 7:
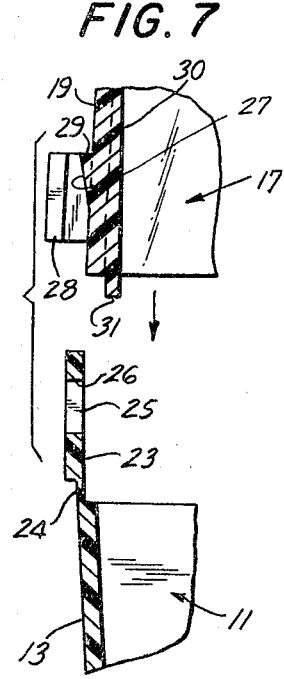
FIG. 7 is a view similar to FIG. 6, showing the box sections in the process of being assembled into the condition shown in FIG. 6.
Figure 8:
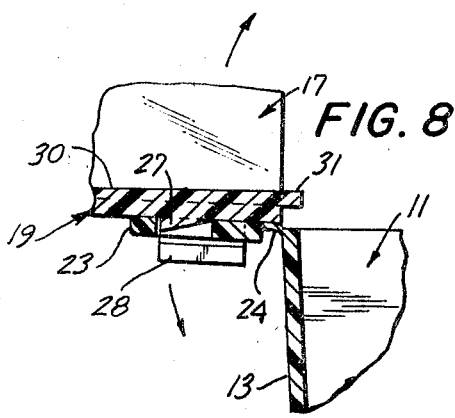
FIG. 8 is a view similar to FIG. 6 showing the way in which the box sections are hingedly connected.

As best indicated in FIG. 9, each tongue has side edges merging into a smoothly rounded free end on the tongue. The side edges may be tapered toward the free end, if desired. The tongue is provided with a cut-out or recess 25 defining a rearwardly directed shoulder 26.

The corresponding side wall 19 of the cover section 17 is molded to provide, on its exterior surface, a projecting keeper 27 and a pair of spaced guides 28. The keeper 27 defines a shoulder 29 facing in the direction opposite to that of the shoulder 26. The surface facing the direction of the tongue 23 is gradually sloped. The guides 28 converge slightly, as best indicated in FIG. 9, and are adapted to engage around the side edges of the tongue 23 when it is directed upwardly along the outer surface of the wall 19. The guides 28 thus constrain the tongue to lie closely adjacent to the exterior surface of the wall 19, and compel it to force its way over the sloping region until the shoulder 26 snaps into an interlocking engagement with the shoulder 29. The parts are then hingedly interlocked as shown in FIGS. 6, 8, 9 and 10. In this condition, the sections of the box are freely movable with respect to each other, in the arcuate directions indicated by the arrows in FIG. 8. The thinned region 24, integrally formed on the body section of the box, establishes a staunch and permanent flexible connection of unusual durability.

To facilitate the contemplated functioning of the hinge, the wall 19 of the cover section is provided on its interior surface with a rib 30 extending in a direction at right angles to the hinge axis. This rib serves a stiffening and reinforcing function, and at its end there is a projection or extension 31 which is adapted to engage with the inner surface of the wall 13 (see FIG. 6) when the two sections of the box are brought together to close the box. The projections 31 are positioning elements which help to retain the box in properly closed condition.

Another feature of the box relates to the releasable clasp means formed on the opposite side walls 14 and 20. One such clasp is illustrated in FIGS. 15 and 16. Adjacent to the edge of the wall 14 of the body section is a loop 32 slightly offset from the plane of the wall 14. In the illustrated embodiment, the offset is in the outward direction. In the corresponding region of the wall 20 of the cover section, a small rib or bead 33 is formed, adapted to snap into and out of a position directly beneath the loop 32, as indicated in FIG. 16. The parts embody a sufficient inherent flexibility and resilience to permit the rib 33 to be snapped into and out of the position described, whereby the box may be retained closed, if desired, but is nevertheless readily openable.

Two such clasps have been shown in the box illustrated. One might suffice, and would be centrally located if only one were used. It is to be observed that the clasp or clasps involve no extraneous parts, rivets, or the like, the loop 32 and the rib 33 being integrally formed on their respective box sections.

Other features of the invention relate to the provision of special formations on the main wall 12 of the body section. A part of this wall is offset inwardly along a substantially rectangular central area 34 (see FIGS. 2–5). Projecting over this area from opposite boundaries thereof are tabs 35. The area 34 defines a shallow recess or depression admirably adapted to accommodate a booklet or similar paper item in a readily accessible but thoroughly inconspicuous disposition, the booklet being adapted to fit beneath the overhanging tabs 35 which thus hold it in position flat against the floor of the shallow recess.

This recess, and the tabs 35, are formed as integral parts of the body section.

Also formed in this region of the wall 12 are upstanding formations 36. They project into the interior of the box section, and are provided with rearwardly directed prongs 37 (see FIG. 14). The elements 36 are so located that the marginal part of a doll's dress may be clamped into position behind them, as best shown in FIG. 14, so that the dress is maintained in an attractive display position.

The parts 36 are integral with the body of the section 11.

Also formed in the wall 12, in the central region, is an aperture 39 adapted to accommodate the out-turned ends 40 of an omega-shaped clamp 41 (see FIG. 3) adapted to extend around the waist portion of a doll and thus hold the doll in an inconspicuous manner against the rear wall of the box.

Figure 5:
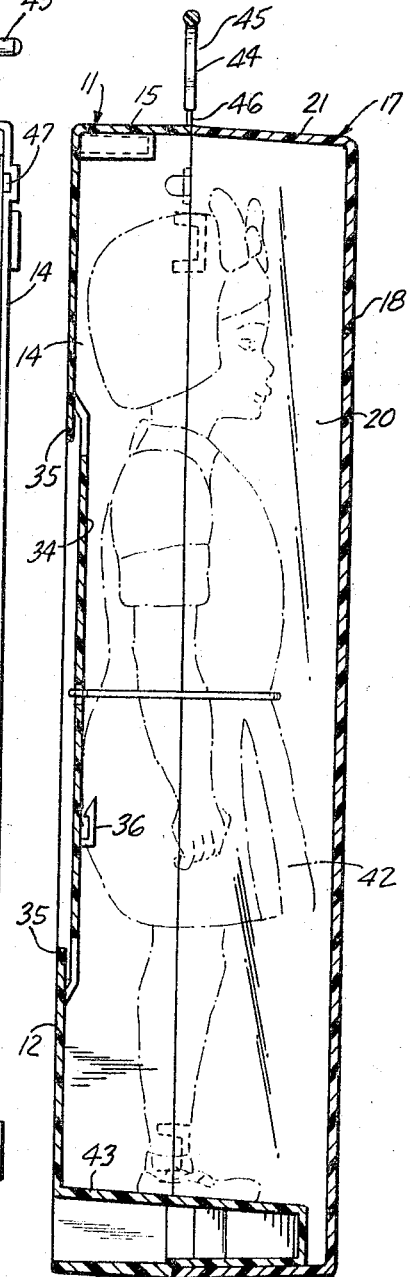
FIG. 5 is a cross-sectional view substantially along the line 5—5 of FIG. 1.

A dressed doll of the character described, and of the type for which the box is admirably suited, is designated by the reference numeral 42 in FIGS. 1, 2 and 5. It is advantageous to rest the doll upon a floor 43 formed as an integral part of the body section of the box. This floor may project forwardly beyond the line of juncture between the sections 11 and 17, but it is so formed and located that when the box is closed the floor and the doll on it are completely enclosed, as indicated in FIG. 5.

One of the important features of the invention relates to the provision of a special carrying handle 44. This handle is formed as an integral part of the body section 11, and is provided with a central region of rod-like character. The handle is bail-shaped and projecting from its ends in opposite directions are small posts 45. The handle is joined to the free edge of the top wall 15 of the box section 11 by means of integral thinned regions 46 similar in nature and mode of functioning to the connecting webs 24 on the hinges between the box sections.

When the handle 44 is in the disposition shown in FIGS. 1, 2, 4 and 5, it serves the purpose of a carrying handle. However, because of the great flexibility of the connecting regions 46, the handle can be readily swung from the position of FIG. 11 to that of FIG. 12, and special openings 47 are provided in the opposed side walls 13, 14 of the body section to accommodate the posts 45 when the handle is swung inward to the position of FIGS. 12 and 13. The posts 45 are inherently resilient and they snap into engagement with the recesses or openings 47. In this disposition of the parts, the central rod-like part of the handle serves as a rung for dolls' clothing. It is understood, of course, that this adjustment of the carrying handle takes place only when the cover section of the box is swung completely out of the way, as indicated in FIG. 4.

Each of the box sections is molded as an integral element, with all the appendages and formations created instantaneously by the molding process. The box can thus be manufactured at low cost, the sections being readily and quickly assembled by merely pushing the tongues 23 into the corresponding guides 28 as hereinbefore described in connection with FIGS. 6–10. If the box is intended to accommodate a doll, the doll is readily inserted, clamped into position by the element 41, the dress adjusted and held down by means of the prongs 37 (FIG. 14) and a descriptive booklet or other appropriate literature is readily inserted into the shallow recess at the rear. The box is then immediately ready for shipment, storage, or display. The doll remains in an attractive display position at all times, it is clearly visible from the front because of the transparent nature of the cover section of the box, and it can readily be reinserted into the box by the child whenever it is desired to do so. The box has play value, since an adjustment of the parts converts it into a "closet" or "dressing case." Being devoid of metallic parts, it is entirely safe and it will maintain its attractive shape and qualities through long periods of usage.

It is to be understood that many of the details herein described and illustrated may be modified by those skilled in the art without necessarily departing from the spirit and scope of the invention as expressed in the appended claims.

What is claimed is:

1. A display box for a doll, comprising independent opposed body and cover sections each of which has a main wall and upstanding peripheral side walls, the cover section being composed of rigid clear transparent material, the body section being composed of a non-transparent molded plastic which is substantially rigid except in thinned web-like regions and is flexible and fatigue-resistant in such regions, said body section walls being of a thickness which imparts rigidity thereto whereby the box has a fixed size and shape, one of the side walls of the body section being provided on its edge with at least one integral projecting tongue connected to the wall by a thinned region of flexible character, the corresponding side wall of the cover section being provided on its exterior surface with an integral formation engaging said tongue and being thereby held in hinged relation to the body section.

2. A display box as defined in claim 1, in which there are at least two such tongues and corresponding formations, defining a pair of spaced hinge connections between the box sections.

3. A display box as defined in claim 1, in which said body section is composed of polypropylene and said cover section is composed of a molded plastic of the type which includes the polystyrenes and the acrylics.

4. A display box as defined in claim 1, in which said tongue has a recess defining a rearwardly directed shoulder and said integral formation comprises (a) an anchorage defining a forwardly directed shoulder and (b) guides constraining the tongue to lie closely adjacent to the cover with said shoulder in interlocked relation.

5. A display box as defined in claim 4, in which said anchorage has a sloping outer face along which the tongue is guided as said linterlocking engagement is brought about, and said guides engaging the side edges of the tongue to hold it against said sloping face.

6. A display box as defined in claim 1, in which said hinged side wall of the cover section is provided on its interior surface with an integral stiffening rib perpendicular to the hinge axis and provided with an extension projecting beyond the edge of the cover side wall for positioning engagement with the interior surface of the corresponding body side wall when the box is closed.

7. A display box as defined in claim 1, in which an integral bail-shaped carrying handle is joined to one of the other side walls of the body section by flexible thinned regions of the character described.

8. A display box as defined in claim 7, in which the medial region of the handle is straight and rod-like and is adapted to serve as a rung for dolls' clothes when the box sections are opened wide and the handle is swung into the area between them.

9. A display box as defined in claim 8, in which the body section and the handle are provided with cooperable means for separably securing the handle in rung defining disposition.

10. A display box as defined in claim 9, in which said cooperable means comprises oppositely projecting springy posts on the handle, and recesses formed in the corresponding pair of opposed side walls for releasable reception of said posts.

11. A display box as defined in claim 1, in which the main wall of the body section is provided with an inwardly offset area and tongues projecting over said area from opposed boundaries thereof, said offset defining a shallow countersunk region adapted to accomodate a descriptive booklet or the like laid flatwise therein and beneath said tongues.

12. A display box as defined in claim 1, in which the main wall of the body section is provided with integral inwardly projecting tabs located and adapted for engagement by marginal regions of a doll's dress so as to hold the latter in display disposition and against displacement, each of said tabs having a rearwardly directed prong at its end to enhance the engagement of the dress between said tab and the wall from which it arises.

13. A display box as defined in claim 1, in which the main wall of the body section is provided in its central region with an aperture, and in which an omega-shaped retaining clip has ends projecting outwardly through said aperture and a central loop adapted to engage a doll to hold it against said wall.

14. A display box as defined in claim 1, in which a releasable clasp is provided between the sections along the side walls opposite to those which are mutually hinged, said clasp comprising a loop integrally formed on the edge of the side wall of the body section, said loop being slightly offset from the plane of said wall, and an integral projection formed on the side wall of the cover section in a position to snap into and out of engagement with said loop.

15. In a box for a doll, a body section having a vertical main rectangular wall and relatively narrow peripheral walls including a top wall and opposed side walls, said body section being composed of a molded plastic which is substantially rigid except in thinned web-like regions and is flexible and fatigue-resistant in such regions, said body section walls being of a thickness which imparts rigidity thereto but the top wall being provided with a pair of spaced thinned web-like regions of flexible character, and a carrying handle in the form of a bail integrally joined to and extending between said thinned regions.

16. A box section and carrying handle as defined in claim 15, in which the handle has a medial straight rod-like part and oppositely projecting posts at its ends, said opposed side walls being provided with recesses adapted releasably to engage said posts and support the medial part of the handle as a clothes rung extending horizontally between said walls.

References Cited

UNITED STATES PATENTS

| | | | |
|---|---|---|---|
| 2,132,318 | 10/1938 | Pilliod et al. | 206—45.34 X |
| 2,515,113 | 7/1950 | Chaplin. | |
| 2,724,208 | 11/1955 | Nelson | 206—45.34 X |
| 2,733,830 | 2/1956 | Ruskin. | |
| 3,040,878 | 6/1962 | DeKolb | 206—45.34 |
| 3,043,354 | 7/1962 | Fitgerald. | |
| 3,126,145 | 3/1964 | Struble. | |
| 3,167,207 | 1/1965 | Kruger et al. | |
| 3,186,574 | 6/1965 | Davidson. | |

LOUIS G. MANCENE, *Primary Examiner.*